United States Patent [19]
Walker et al.

[11] Patent Number: 5,323,269
[45] Date of Patent: Jun. 21, 1994

[54] SYSTEM FOR TRANSMITTING AND MONITORING LASER LIGHT AND METHOD FOR OPTICAL MONITORING OF A TRANSMISSION PATH

[75] Inventors: Richard Walker, Ann Arbor, Mich.; Klaus Ludewigt, Oststeinbek, Fed. Rep. of Germany

[73] Assignee: Siemens Aktiengesellschaft, Munich, Fed. Rep. of Germany

[21] Appl. No.: 968,340

[22] Filed: Oct. 29, 1992

[30] Foreign Application Priority Data

Apr. 30, 1990 [DE] Fed. Rep. of Germany ... 9004934[U]

[51] Int. Cl.⁵ .................... G02B 9/00; B23K 26/00
[52] U.S. Cl. .................... 359/739; 359/589; 359/634; 359/726; 359/738; 250/205; 219/121.62
[58] Field of Search ......... 359/580, 589, 634, 726, 359/738–739, 618, 722; 219/121.6–121.62, 121.76; 250/205; 385/31, 33

[56] References Cited

U.S. PATENT DOCUMENTS

| | | |
|---|---|---|
| 4,423,726 | 1/1984 | Imagawa .................... 128/303.1 |
| 4,844,574 | 7/1989 | Chande .................... 219/121.6 |
| 4,845,354 | 7/1989 | Gupta et al. .................... 219/121.62 |

FOREIGN PATENT DOCUMENTS

| | | |
|---|---|---|
| 194856 | 9/1986 | European Pat. Off. |
| 331891 | 9/1989 | European Pat. Off. |
| 60-22385 | 2/1985 | Japan |

*Primary Examiner*—Loha Ben
*Assistant Examiner*—James Phan
*Attorney, Agent, or Firm*—Herbert L. Lerner; Laurence A. Greenberg

[57] ABSTRACT

A system and method for transmitting and monitoring laser light includes a laser for emission of a first beam with a given wavelength into a transmission path. A second beam is generated with a wavelength differing from the given wavelength. The second beam is coupled into the transmission path of the first beam and the first and second beams are superimposed in a propagation direction. The second beam is wavelength-selectively reflected in the transmission path as a reflected second beam. The reflected second beam is decoupled from the transmission path. A detector is provided for the reflected second beam. An interruptor is operatively connected to the detector for interrupting the first beam.

17 Claims, 1 Drawing Sheet

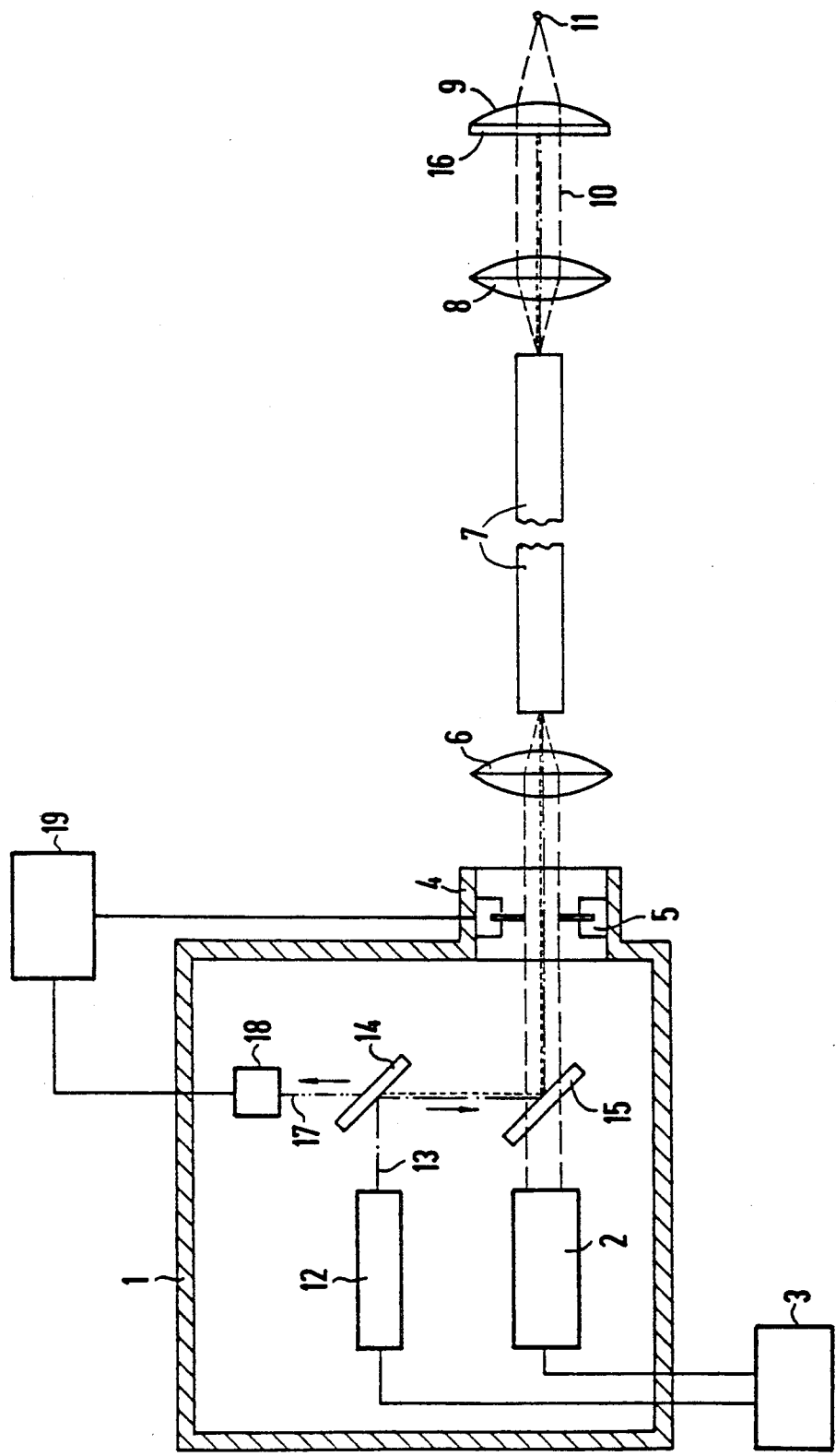

SYSTEM FOR TRANSMITTING AND MONITORING LASER LIGHT AND METHOD FOR OPTICAL MONITORING OF A TRANSMISSION PATH

CROSS-REFERENCE TO RELATED APPLICATION

This application is a continuation of International application Ser. No. PCT/DE91/00352, filed Apr. 25, 1991.

The invention relates to a system for transmitting and monitoring laser light and a method for optical monitoring of a transmission path.

Laser light is often transmitted by means of optical wave guides. That is also true for high-intensity laser light, which is intended for use in mechanical machining of workpieces, for instance.

The use of optical fibers or fiber optics makes it possible to easily integrate Nd:YAG lasers or other lasers, such as $CO_2$ lasers, into production systems, where nevertheless there is a high degree of freedom and flexibility. The freedom and flexibility are very much greater than with conventional fixed or rigid optical systems with mirrors or lenses. With fiber optics, access into even very tight, constricted spaces is possible, so that three-dimensional parts can be machined relatively simply and economically.

However, if fiber optics are used to transmit high-power laser energy, it entails various threats to safety that do not arise in stationary optical configurations. Major problems can arise, for instance, if the fiber breaks or is bent so severely that total reflection can no longer take place. The laser energy can then reach other points and cause destruction and/or injuries.

Various methods and apparatus are known for solving the problem and preventing humans or equipment from being exposed to the laser radiation of the Nd:YAG laser, $CO_2$ laser, or any other laser. In such configurations, a detector for the primary wavelength or a secondary wavelength of the laser radiation is normally provided at the end of the optical fiber, at or near the focusing configuration. If laser radiation no longer enters there, then the laser beam is automatically interrupted. However, such configurations have the following disadvantages:

In pulsed laser operation, at least one light pulse will enter the optical waveguide before it is determined that a problem exists, such as breakage of the optical waveguide. The detector increases the space required in the surroundings of the focusing configuration, which naturally limits the accessibility when the laser is used for machining in tight spaces or constricted situations. If the focusing optics are missing or are incorrectly installed, then once again that is not detected.

It is accordingly an object of the invention to provide a system for transmitting and monitoring laser light and a method for optical monitoring of a transmission path, which overcome the hereinafore-mentioned disadvantages of the heretofore-known methods and devices of this general type and which combine great safety with great flexibility.

With the foregoing and other objects in view there is provided, in accordance with the invention, a system for transmitting and monitoring laser light, comprising a laser for emission of a first beam with a given wavelength into a transmission path; means for generating a second beam having a wavelength differing from the given wavelength; means for coupling the second beam into the transmission path of the first beam and superimposing the first and second beams in a propagation direction; means disposed in the transmission path for wavelength-selective reflection of the second beam as a reflected second beam; means for decoupling the reflected second beam from the transmission path; a detector for the reflected second beam; and an interruptor being operatively connected to the detector for interrupting the first beam.

In general terms, the aforementioned object is attained in accordance with the invention by placing a supplementary laser in the vicinity of the first laser, which has a wavelength that differs from that of the first laser and which has a beam that is superimposed on the beam of the first laser; a surface of the focusing optics is provided with a coating reflecting the light of the supplementary laser; an optical element that laterally reflects the reflected light of the supplementary laser and a detector for that light are provided in the vicinity of the first laser, and the detector is connected to an interruptor for the beam of the first laser.

With the objects of the invention in view, there is also provided a method for optical monitoring of a transmission path, which comprises emitting a first beam with a given wavelength from a laser into a transmission path having an end; coupling a second beam with a wavelength differing from the given wavelength into the transmission path of the first beam while superimposing the first and second beams in a propagation direction; wavelength-selectively reflecting the second beam at the end of the transmission path as a reflected second beam; decoupling the reflected second beam from the transmission path; measuring the intensity of the decoupled reflected second beam to obtain a measurement outcome; and enabling and interrupting the transmission path for the first beam as a function of the measurement outcome.

It is accordingly not only the laser beam of the first laser, with which workpiece machining is to be performed, for instance, that is sent over the transmission path by way of which the laser light is transmitted. The beam of the supplementary laser is transmitted over the same optical path and only needs to have relatively low power in order to perform its task. This supplementary laser beam passes through the same optical elements as the primary laser beam, but in contrast to the primary laser beam it is reflected by the focusing optics and is then carried back as far as the laser head, where it is deflected laterally and enters the detector. Light of the supplementary laser will always be received by the detector in normal operation. If the optical transmission path is interrupted, then light from the supplementary laser will no longer reach the detector. In that case, the laser beam of the first laser will be interrupted immediately. This is suitably performed by means of a shutter, such as a shutter diaphragm or the like. It would also be conceivable per se to interrupt the electric feed line to the first laser, but this is not practical if only one of a plurality of light paths that are served by the same laser simultaneously, is interrupted. The supplementary laser should have a power that is low enough to ensure that no damage of any kind to human beings or equipment can occur if the optical transmission path is interrupted, for example by breakage of the optical waveguide, and the laser beam reaches an undesirable location.

The system of the invention can also be used in transmission paths without optical waveguides, although it is especially advantageous for such paths.

With the aid system and method according to the invention, the following defects can be ascertained:

the coupling optics for the optical waveguide are not mounted on the laser head or are incorrectly adjusted;

the optical wave guide, if present, is not connected to the coupling optics;

the optical waveguide is broken or has too small a radius of curvature, which leads to excessive losses;

the focusing configuration is not mounted on the end of the optical waveguide;

the focusing optics are not inserted into the focusing unit.

Suitably, both lasers have a common laser head, in which a deflecting optical element for the back-reflected beam of the supplementary laser and the detector are disposed. In this way, the light path of the laser can be monitored all the way back into the laser head.

In accordance with another feature of the invention, the deflecting optical element is an obliquely disposed plate that admits the light of the first laser and reflects that of the supplementary laser.

In accordance with a further feature of the invention, the supplementary laser is a pulsed laser which emits its pulse shortly before a pulse of the primary laser in each case, so that the perfection of the optical transmission path can be checked shortly before each pulse of the primary power laser. However, constant checking is possible if the supplementary laser is a continuous wave laser.

In accordance with an added feature of the invention, the primary laser normally operates in the infrared range, if it is intended for use in workpiece machining. In that case, it is especially practical if the supplementary laser transmits visible light, and in particular red light. In such a case, on one hand it is relatively simple to find a coating that admits the infrared light but reflects the red light. On the other hand, if the reflection is not complete, a little light of the supplementary laser will always reach the machining point and produce a visible light spot there, with which the adjustment can be performed before the power laser is switched on.

As already mentioned, the system can be practically used in cases in which the laser energy is carried from one point to another by an optical waveguide. In principle, other optical systems that have only mirrors and lenses can also be checked and secured.

In accordance with an additional feature of the invention, all of the optical elements are provided with anti-reflective coatings for the light of the first laser, because even small fractions of reflected light can have very damaging effects, due to the high power densities. It is equally practical for the optical elements to be provided with an anti-reflective coating for the light of the supplementary laser as well, but naturally this does not apply to the surface of the focusing optics that is provided with the coating which reflects the light of the supplementary laser.

In accordance with a concomitant feature of the invention, the supplementary laser should only radiate a little energy, to avoid the danger of damage and injuries. A laser diode is especially suitable in this respect.

Other features which are considered as characteristic for the invention are set forth in the appended claims.

Although the invention is illustrated and described herein as embodied in a system for transmitting and monitoring laser light and a method for optical monitoring of a transmission path, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

The drawing is a fragmentary, diagrammatic, partly sectional view with a block circuit diagram, showing an embodiment of the system according to the invention.

Referring now to the single figure of the drawing in detail, there is seen a primary or first power laser 2 which is supplied by a current source 3 and is disposed in a housing 1. A first laser beam 10 is guided through a laser head 4 which is provided with a shutter diaphragm or interruptor 5, to a coupling optical system 6 that guides the laser beam into an optical waveguide 7. A collimating optical system 8 and a focusing optical system 9 are provided at an outlet end of the optical waveguide, in order to focus the first laser beam 10 of the primary or first power laser 2, which is represented by dashed lines, into a point 11 at which workpiece machining is to be performed.

A low-power supplementary or second laser 12, in particular a laser diode which is operated continuously, is also disposed in the housing 1. Light of the supplementary or second laser 12, in the form of a second beam 13, which is represented in phantom lines, strikes a semi-transparent plate 14 and is guided downward onto an obliquely disposed plate 15 (deflecting mirror) which is disposed in front of the primary or first laser 2. Through the use of this plate 15, which is transparent to the light of the primary or first laser 2 and is reflective to the light of the supplementary or second laser 12, the second light beam 13 is sent over the same path as the first light beam 10 of the primary or first laser 2. The focusing optical system 9 is provided with a coating 16 which, although transparent to the first laser light beam 10 of the primary or first laser 2, reflects the light of the supplementary or second laser 12, so that the second light beam 13 is sent back over the same path by which it came. The light of the supplementary or second laser 12 which is reflected back into the laser head 4, is represented by dotted lines in the drawing and is provided with reference numeral 17. This reflected second light beam 17 is reflected by the plate 15 and reaches a sensor or detector 18 through the plate 14. If the intensity of the decoupled reflected second light beam 17 measured at the detector 18 exceeds a predetermined command value, then the shutter diaphragm or interruptor 5 that is operatively connected to it is electrically closed by a circuit 19, so that no further light of the primary or first laser 2 can escape to the outside.

All of the optical elements, such as the reflecting plates, lenses, and end surfaces of the optical wave guide 7, are provided with coatings which prevent or at least minimize reflections of the first light beam 10 of the primary or first laser 2. These coatings are not shown in the drawing.

When the primary or first power laser 2 is a pulsed laser, the measurement of the intensity of the reflected second beam 17, being decoupled from the transmission path of the first beam 10 and striking the detector 18, is preferably performed during an interval between pulses of the primary or first laser 2. This averts interference with the measurement signal passed on by the detector 18 from the high-power pulse of the primary or first power laser 2.

Instead of being disposed on the focusing optical system 9, the coating 16 may also be disposed on some other optical element that is located in the end region of the beam path of the first laser beam 10 and is optically transparent for that beam 10, such as a non-illustrated plane-parallel plate.

We claim:

1. A system for transmitting and monitoring laser light, comprising:
   a) a laser for emission of a first beam with a given wavelength into a transmission path and towards a workpiece disposed beyond an outlet end of the transmission path;
   b) means for generating a second beam having a wavelength differing from the given wavelength;
   c) means for coupling the second beam into the transmission path of the first beam and superimposing the first and second beams in a propagation direction;
   d) means disposed in the transmission path for wavelength-selective reflection of the second beam as a reflected second beam;
   e) means for decoupling the reflected second beam from the transmission path;
   f) a detector for detecting the reflected second beam; and
   g) an interruptor being operatively connected to said detector for interrupting the first beam.

2. The system according to claim 1, including a surface disposed in the transmission path having a coating for reflecting the second beam.

3. The system according to claim 1, wherein said reflection means is a focusing optical system having a surface disposed in the transmission path with a coating for reflecting the second beam.

4. The system according to claim 1, wherein said means for generating the second beam is a supplementary laser.

5. The system according to claim 4, wherein said supplementary laser is a laser diode.

6. The system according to claim 1, including lenses being disposed in the transmission path and having anti-reflective films for the first beam.

7. The system according to claim 1, wherein said laser is a first laser, said means for generating a second beam is a supplementary laser, and said means for coupling the second beam into the transmission path includes a deflecting optical element in the form of an obliquely disposed plate admitting light of the first beam and reflecting light of the second beam.

8. The system according to claim 7, wherein said supplementary laser is a continuous wave laser.

9. The system according to claim 7, wherein said supplementary laser transmits visible light.

10. The system according to claim 7, wherein said supplementary laser transmits visible red light.

11. The system according to claim 1, including an optical waveguide.

12. The system according to claim 1, including optical elements in the form of a deflecting optical element, lenses and an optical waveguide all being disposed in the transmission path and all having anti-reflective coatings for light of the first beam.

13. The system according to claim 11, wherein said means for generating the second beam is a supplementary laser, one of said lenses is a focusing optical system having a surface disposed in the transmission path with a coating for reflecting the second beam, and at least some of said optical elements with the exception of said surface with said reflective coating have an anti-reflective coating for light of the second beam.

14. The system according to claim 1, wherein said interruptor is a shutter.

15. The system according to claim 1, wherein said interruptor is an electrically actuatable shutter diaphragm.

16. A method for optical monitoring of a transmission path, which comprises:
   a) emitting a first beam with a given wavelength from a laser into a transmission path having an end and beyond the end of the transmission path;
   b) coupling a second beam with a wavelength differing from the given wavelength into the transmission path of the first beam while superimposing the first and second beams in a propagation direction;
   c) wavelength-selectively reflecting the second beam at the end of the transmission path as a reflected second beam;
   d) decoupling the reflected second beam from the transmission path;
   e) measuring the intensity of the decoupled reflected second beam to obtain a measurement outcome; and
   f) enabling and interrupting the transmission path for the first beam as a function of the measurement outcome.

17. The method according to claim 16, which comprises emitting the first beam as a pulsed first beam, and measuring the intensity of the decoupled reflected second beam during an interval between two successive pulses of the first beam.

* * * * *